(12) United States Patent
Vanstone

(10) Patent No.: US 7,328,338 B1
(45) Date of Patent: Feb. 5, 2008

(54) TRANSACTION VERIFICATION PROTOCOL FOR SMART CARDS

(75) Inventor: Scott A. Vanstone, Waterloo (CA)

(73) Assignee: Certicom Corp., Mississauga, Ontario (CA)

( * ) Notice: Subject to any disclaimer, the term of this patent is extended or adjusted under 35 U.S.C. 154(b) by 0 days.

(21) Appl. No.: 09/360,575

(22) Filed: Jul. 26, 1999

Related U.S. Application Data

(63) Continuation of application No. 08/790,545, filed on Jan. 30, 1997, now Pat. No. 5,955,717.

(30) Foreign Application Priority Data

Jan. 31, 1996 (GB) .................................. 9601924.5

(51) Int. Cl.
*H04L 9/00* (2006.01)
(52) U.S. Cl. ......................................... 713/159; 705/65
(58) Field of Classification Search ................ 713/201, 713/169, 155, 159; 703/53, 64, 67, 75, 77; 705/65
See application file for complete search history.

(56) References Cited

U.S. PATENT DOCUMENTS

| | | | |
|---|---|---|---|
| 5,276,736 A * | 1/1994 | Chaum ......................... | 705/69 |
| 5,295,188 A | 3/1994 | Wilson et al. .............. | 235/379 |
| 5,396,558 A * | 3/1995 | Ishiguro et al. ............... | 705/67 |
| 5,455,407 A | 10/1995 | Rosen ......................... | 235/380 |
| 5,485,519 A | 1/1996 | Weiss ........................... | 380/23 |
| 5,637,846 A * | 6/1997 | Boers et al. ................ | 235/383 |
| 5,955,717 A * | 9/1999 | Vanstone ..................... | 235/380 |
| 6,049,785 A * | 4/2000 | Gifford ........................ | 705/39 |
| 6,069,952 A * | 5/2000 | Saito et al. .................. | 705/57 |

FOREIGN PATENT DOCUMENTS

EP          0588339 A2        3/1994

OTHER PUBLICATIONS

Definition of Smart Card, http://en.wikipedia.org/wiki/Smart_card, accessed on Aug. 31,2006.*

* cited by examiner

*Primary Examiner*—Nasser Moazzami
*Assistant Examiner*—Brandon S Hoffman
(74) *Attorney, Agent, or Firm*—Brett J. Slaney; John R. S. Orange; Blake, Cassels & Graydon LLP

(57) ABSTRACT

A protocol appropriate for smartcard purchase applications such as those that might be completed between a terminal or ATM and a users personal card is disclosed. The protocol provides a signature scheme which allows the card to authenticate the terminal without unnecessary signature verification which is an computationally intense operation for the smart card. The only signature verification required is that of the terminal identification (as signed by the certifying authority, or CA, which is essential to any such protocol). In the preferred embodiment, the protocol provides the card and terminal from fraudulent attacks from impostor devices, either a card or terminal.

21 Claims, 2 Drawing Sheets

| Smartcard Action | Transmission | Terminal Action |
|---|---|---|
| | | Generate unique purchase ID and create transaction message |
| | ← Purchase ID, TA 220 bits [TIU ID, $Y_T$] CA 355 bits | |
| Verify Certificate signed by CA 15,500 clock cycles Generate Random Number (R2) and sign transaction number using terminal's public key 15,500 clock cycles | | |
| Send signed transaction data, hash and certificate signed by CA | [r1,s1] card → 375 bits Hash 128 bits [Smartcard ID, Smartcard Public Key] CA 355 bits | |
| | ← | Verify Certificate signed by CA Given the hash h and s1, deduce $\alpha^{kT}$ session key Recover message from r1 |
| | R2 100 bits | Send R2 contained in message to card to prove identity and to acknowledge the provision of service |
| Check R2 to complete transaction | | |
| Total computation time = 31,000 clock cycles | Total bits transmitted = 1533 | |

| Smartcard Action | Transmission | Terminal Action |
|---|---|---|
| | | Generate unique purchase ID and create transaction message |
| | ← Purchase ID, TA 220 bits [TIU ID, $Y_T$] CA 355 bits | |
| Verify Certificate signed by CA 15,500 clock cycles Generate Random Number (R2) and sign transaction number using terminal's public key 15,500 clock cycles | | |
| Send signed transaction data, hash and certificate signed by CA | → [r1,s1] card 375 bits Hash 128 bits [Smartcard ID, Smartcard Public Key] CA 355 bits | |
| | ← | Verify Certificate signed by CA Given the hash h and s1, deduce $\alpha^{kT}$ session key Recover message from r1 |
| | R2 100 bits | Send R2 contained in message to card to prove identity and to acknowledge the provision of service |
| Check R2 to complete transaction | | |
| Total computation time = 31,000 clock cycles | Total bits transmitted = 1533 | |

Figure 2

TRANSACTION VERIFICATION PROTOCOL FOR SMART CARDS

This application is a continuation of application now U.S. Pat. No. 5,955,717 application Ser. No. 08/790,545 filed on Jan. 30, 1997.

The present invention relates to methods for verifying the authenticity of partners in an electronic transaction.

It has become widely accepted to conduct transactions such that as financial transactions or exchange of documents electronically. In order to verify the transaction, it is also well-known to "sign" the transaction digitally so that the authenticity of the transaction can be verified. The signature is performed according to a protocol that utilizes the message, i.e. the transaction, and a secret key associated with the party. Any attempt to tamper with the message or to use a key other than that of the signing party will result in an incompatibility between the message and the signature or will fail to identify the party correctly and thereby lead to rejection of the transaction.

The signature must be performed such that the parties' secret key cannot be determined. To avoid the complexity of distributing secret keys, it is convenient to utilize a public key encryption scheme in the generation of the signature. Such capabilities are available where the transaction is conducted between parties having access to relatively large computing resources but it is equally important to facilitate such transactions at an individual level where more limited computing resources are available.

Automated teller machines (ATMs) and credit cards are widely used for personal transactions and as their use expands, so the need to verify such transactions increases. Transaction cards are now available with limited computing capacity, so-called "Smart Cards," but these are not sufficient to implement existing digital signature protocols in a commercially viable manner. As noted above, in order to generate a digital signature, it is necessary to utilize a public key encryption scheme. Most public key schemes are based on the Diffie Helman Public key protocol and a particularly popular implementation is that known as DSS. The DSS scheme utilizes the set of integers Zp where p is a large prime. For adequate security, p must be in the order of 512 bits although the resultant signature may be reduced mod q, where q divides p−1, and may be in the order of 160 bits.

The DSS protocol provides a signature composed of two components r, s. The protocol requires the selection of a secret random integer k from the set of integers (0, 1, 2, . . . q−1), i.e.

$k \in \{0,1,2, \ldots q-1\}$.

The component r is then computed such that $r = \{\beta^k \bmod p\} \bmod q$ where $\beta$ is a generator of q.

The component s is computed as $s = [k^{-1}(h(m)) + ar] \bmod q$ where m is the message to be transmitted,
h(m) is a hash of the message, and
a is the private key of the user.

The signature associated with the message is then s,r which may be used to verify the origin of the message from the public key of the user.

The value of $\beta^k$ is computationally difficult for the DSS implementation as the exponentiation requires multiple multiplications mod p. This is beyond the capabilities of a "Smart Card" in a commercially acceptable time. Although the computation could be completed on the associated ATM, this would require the disclosure of the session key k and therefore render the private key, a, vulnerable.

An alternative encryption scheme that provides enhanced security at relatively small modulus is that utilizing elliptic curves in the finite field $2^m$. A value of m in the order of 155 provides security comparable to a 512 bit modulus for RSA and therefore offers significant benefits in implementation. Diffie Helman Public Key encryption utilizes the properties of discrete logs so that even if a generator $\beta$ and the exponentiation $\beta^k$ are known, the value of k cannot be determined.

A similar property exists with elliptic curves where the addition of two points on a curve produces a third point on the curve. Similarly, multiplying a point by an integer k produces a point on the curve.

However, knowing the point and the origin does not reveal the value of the integer 'n' which may then be used as a session key for encryption. The value kP, where P is an initial known point, is therefore equivalent to the exponentiation $\beta^k$.

Elliptic Curve Crytposystems (ECC) offer advantages over other public key cryptosystems when bandwidth efficiency, reduced computation, and minimized code space are application goals.

SUMMARY OF THE INVENTION

The preferred embodiment of the present invention discloses a protocol optimized for an ECC implementation for use with a "smartcard" having limited computing capacity. The protocol has been found to provide superior performance relative to other smartcard protocols and is achievable with an ECC implementation.

The protocol disclosed is appropriate for smartcard purchase applications such as those that might be completed between a terminal or ATM and a user's personal card. The protocol provides a signature scheme which allows the card to authenticate the terminal without unnecessary signature verification which is a computationally intense operation for the smart card. The only signature verification required is that of the terminal identification (as signed by the certifying authority, or CA, which is essential to any such protocol). In the preferred embodiment, the protocol protects the card and terminal from fraudulent attacks from impostor devices, either a card or terminal.

In accordance with an embodiment of the invention, a method of performing a transaction between a first and a second participant is provided wherein the second participant permits a service to be provided to the first participant in exchange for a payment. The method comprises the steps of the first participant verifying the legitimacy of the second participant to obtain assurance that the service will be provided upon payment, the second participant verifying the legitimacy of the first participant to obtain assurance that payment will be secured upon provision of the service, and the second participant obtaining a digital signature for the first participant on the transaction whereby the second participant may obtain payment from a third participant.

BRIEF DESCRIPTION OF THE DRAWING

An embodiment of the invention will now be described by way of example only with reference to the accompanying drawings, in which:

FIG. 2 is a chart that schematically illustrates the protocol.

DESCRIPTION OF THE PREFERRED EMBODIMENTS

Figure 1:
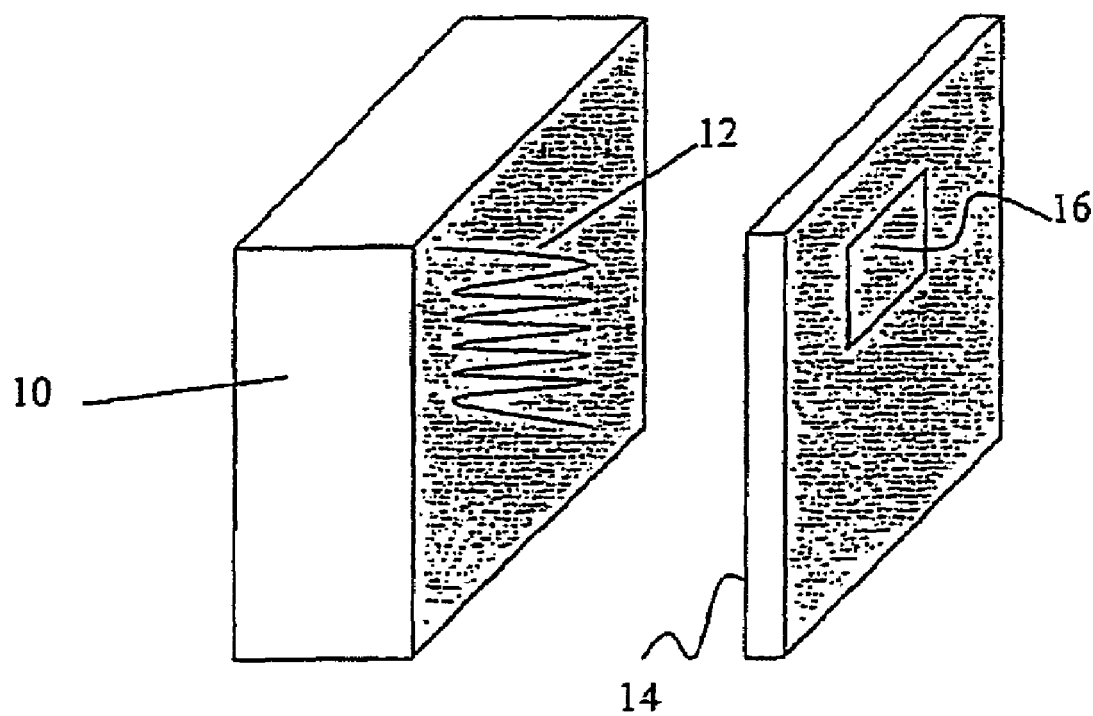
FIG. 1 is a diagrammatic representation of a scanning terminal and personal transaction card.

Referring therefore to FIG. 1, a scanner terminal 10 has an inductive coupling 12 to cooperate with a card 14. When a card 14 is passed through the inductive coupling 12 a transaction is recorded within a memory 16 on the card 14. Typically the transaction will debit the card with a set amount, e.g. an admission price, and the terminal 10 is credited a corresponding amount. The terminal is connected through a network to a central computer located at a financial institution that maintains records of transactions in a conventional manner.

To avoid fraudulent transactions being recorded at either the card or terminal the protocol shown in FIG. 2 is utilized.

Upon the scanner sensing the card through coupling 12, a unique purchase I.D. (PID) is generated by the terminal 10. The terminal 10 has a private key, t, stored in a secure location and a corresponding public key $Y^t$ equal to $\alpha^t$. The terminal 10 generates a message, M1, consisting of the purchase I.D. PID and the transaction amount, TA. It also appends to the message M1 a certificate signed by the certifying authority CA that includes terminal identification information TIU ID and the public key $Y_t$. The message M1 is received by the card 14.

Card 14 has a private key a stored securely in memory 16 and a public key $Y_c$ equal to $\alpha^a$. ($\alpha$ is the generator point for the curve). The card verifies the terminals certificate as signed by the certifying authority CA according to a normal elliptic curve scheme. Having verified the certificate, the card generates a pair of random numbers R2 and R3 and signs the unique purchase I.D. PID using the terminals public key according to an established protocol.

To effect signing, the card generates a random integer k and computes a session parameter $\alpha^k$. It also computes $Y_t^k$ and generates signature components r1 and s1.

The component r1 is provided by $M2 * Y_t^k$, mod L, where:
M2 is the message TA//TIU ID//R2//PID, and
$L = 2^l - 1$ and l is an integer greater than or equal to the number of bits in M2. (//signifies concatenation).

The component s1 is provided by h.a+k mod q where:
q is the order of the curve and
h is a hash $h(M2//\alpha^k//R3)$.

The card now sends signature components r1, s1 the hash h and a certificate issued by the certifying authority CA containing its ID and public key to the terminal 10.

The terminal verifies the cards credentials as signed by the CA. Given the hash h and s1 it can calculate the value $\alpha^{kt}$ and thereby recover the message M2 from r1 using the cards public key. As the message M2 includes the PID, the terminal is able to verify the authenticity if the card 10.

The recovered message includes R2 which is then returned to the card 10 to prove that the terminal is extracting R2 in real time, i.e. during the transit of the card through the coupling 12, using its private key. This also prevents a reply attack by the terminal 10.

The receipt of R2 also serves to acknowledge provision of the service. Upon receipt, the card checks R2 to ensure the message was recovered using the terminals private key. This confirms that the card was talking to the terminal rather than a fraudulent device which would not have the private key, t, available.

If the card confirms the receipt of R2, it transmits the random R3 to the terminal 10 to complete the transaction. R3 is required for card signature verification by the bank and so R3 is retained by the terminal 10 for central processing purposes. R3 is not released by the card until it has received R2 which confirms that the terminal 10 is performing computations in real time.

The terminal 10 is required to submit to the financial institution the stored values of R2, R3, TA, PID, TIU ID, s1 and $\alpha^k$ in addition to the credentials of both card and terminal 10. With this information the bank card is able to reproduce hash h, i.e. $h(M2//\alpha^k//R3)$ by using the cards public key $Y_c$ to prove that the transaction was authentic.

It will be noted that the last two passes are essentially trivial and do not require computation. Accordingly the computation required by the card is minimal, being restricted to one verification and one signature that involves two exponentiations, with the balance avoiding computationally intense operations.

As indicated in FIG. 2, an ECC implementation is the field $2^{155}$ using an anomalous curve of this protocol would result in less bandwidth (1533 bits) and reduced computation for the smartcard (31,000 clock cycles). The computational savings over previous protocols are possible due to features of the elliptic curve signature scheme used by the smartcard.

The particular benefits and attributes may be summarized as:

1. The purchase identifier PID is unique and is required to prevent terminal replay to the bank. If the purchase identifier is not unique, a random number R1 will also be required to provide the equivalent of the PID.
2. The random bit string R2 is required to prevent replay to the card.
3. A hash function (h) such as the SHA1 is required to prevent modification of the message (m) and the terminal's identification (TIU ID).
4. There appears to be no advantage to having the transaction amount signed by the terminal, resulting in one less signature verification for the card. The reason for this is that the message signed by the card contains a random number R2 which can only be recovered by the terminal.
5. Using this scheme, the message III may only be recovered by the terminal (note the terminal's public key is used in step III therefore requiring the terminal's private key to verify and recover contents). By demonstrating to the card that the random string (R2) was obtained from the message, the terminal can be authenticated to the card.

I claim:

1. A method of performing a transaction in a communication system between a first and a second participant wherein said second participant permits a service to be provided to said first participant in exchange for a payment, said method comprising the steps of:
   a) upon initiation of said transaction by said first participant, said second participant sending a first message to said first participant, said first message including information pertaining to said second participant;
   b) said first participant verifying said information pertaining to said second participant;
   c) said first participant generating a first value and a second value;
   d) said first participant preparing a second message comprising said first value;
   e) said first participant preparing a digital signature using said second message;

f) said first participant sending said digital signature and information pertaining to said first participant to said second participant;

g) said second participant verifying said information pertaining to said first participant;

h) said second participant obtaining said second message using said digital signature and obtaining said first value using said second message;

i) said second participant sending said first value to said first participant to acknowledge provision of said service; and i) said first participant verifying said first value and sending said second value to said second participant to enable said second participant to obtain said payment from a third participant using said second value.

2. A method according to claim 1 wherein said first participant is a holder of a card which performs cryptographic operations.

3. A method according to claim 2 wherein said second participant is a terminal.

4. A method according to claim 3 wherein said third participant is a financial institution.

5. A method according to claim 1 wherein said information pertaining to said second participant included in said first message includes details and credentials of said second participant; and said first participant verifies said details and said credentials in step b).

6. A method according to claim 1 wherein said information pertaining to said first participant included in said second message includes details and credentials of said first participant; and said second participant verifies said details and credentials in step g).

7. A method according to claim 1 wherein said second message includes a challenge and step i) further comprises:
  i) said second participant generating a response to said challenge;
  ii) said second participant sending a third message including said response to said first participant;
  iii) said first participant verifying said response; and
  iv) said first participant sending a fourth message to said second participant such that said digital signature is provided by said second message and said fourth message.

8. A method according to claim 7 further comprising:
  i) said second participant verifying information in said fourth message;
  ii) said second participant completing said transaction by providing said service; and
  iii) said second participant sending said third participant a subset of said first, second, third and fourth messages to obtain said payment.

9. A method according to claim 8 further comprising:
  i) said third participant verifying said subset;
  ii) said third participant providing said payment to said second participant.

10. A method according to claim 5 wherein said credentials include a public key certificate.

11. A method according to claim 7 wherein said challenge is a nonce.

12. A system for performing a transaction between a first and second participant wherein said second participant permits a service to be provided to said first participant in exchange for a payment, said system comprising at least said second correspondent having a cryptographic processor that is configured for:

a) upon initiation of said transaction by said first participant, sending a first message to said first participant, said first message including information pertaining to said second participant;

b) receiving from said first participant, a digital signature and information pertaining to said first participant, said digital signature being prepared using a second message, said second message being prepared to comprise a first value, said first value being generated by said first participant along with a second value;

c) verifying said information pertaining to said first participant;

d) obtaining said second message using said digital signature and obtaining said first value using said second message;

e) sending said first value to said first participant to acknowledge provision of said service; and f) receiving from said first participant, said second value upon said first participant verifying said first value, said second to be used to obtain payment from a third participant.

13. The system according to claim 12 wherein said second participant is a terminal and said first participant is a card which performs cryptographic operations.

14. The system according to claim 13 wherein said third participant is a financial institution.

15. The system according to claim 12 wherein information pertaining to said second participant included in said first message includes details and credentials of said second participant.

16. The system according to claim 12 wherein said information pertaining to said first participant included in said second message includes details and credentials of said first participant; and said second participant verifies said details and credentials in step c).

17. The system according to claim 12 wherein said second message includes a challenge and step f) further comprises:
  i) said second participant generating a response to said challenge;
  ii) said second participant sending a third message including said response to said first participant; and
  iii) said second participant receiving from said first participant upon said first participant verifying said response, a fourth message such that said digital signature is provided by said second message and said fourth message.

18. The system according to claim 17 further comprising:
  i) said second participant verifying information in said fourth message;
  ii) said second participant completing said transaction by providing said service; and
  iii) said second participant sending said third participant a subset of said first, second, third and fourth messages to obtain said payment.

19. The system according to claim 18 further comprising:
  i) said second participant obtaining said payment from said third participant upon said third participant verifying said subset.

20. The system according to claim 15 wherein said credentials include a public key certificate.

21. The system according to claim 17 wherein said challenge is a nonce.

* * * * *